(12) United States Patent  
Jiang et al.

(10) Patent No.: US 8,480,997 B2  
(45) Date of Patent: Jul. 9, 2013

(54) METHOD FOR PREPARING MANGANESE SULFATE MONOHYDRATE

(75) Inventors: Zhiguang Jiang, Anshun (CN); Dong Hua, Dazu County Chongqing (CN)

(73) Assignees: Guizhou Redstar Developing Co., Ltd., Anshun Guizhou Province (CN); Beijing Maxqueen Technology Co., Ltd., Beijing (CN)

( * ) Notice: Subject to any disclaimer, the term of this patent is extended or adjusted under 35 U.S.C. 154(b) by 0 days.

(21) Appl. No.: 13/581,511

(22) PCT Filed: Jul. 20, 2010

(86) PCT No.: PCT/CN2010/075309  
§ 371 (c)(1),  
(2), (4) Date: Aug. 28, 2012

(87) PCT Pub. No.: WO2011/120272  
PCT Pub. Date: Oct. 6, 2011

(65) Prior Publication Data  
US 2012/0321546 A1 Dec. 20, 2012

(30) Foreign Application Priority Data  
Mar. 29, 2010 (CN) .......................... 2010 1 0135801

(51) Int. Cl.  
C01B 17/96 (2006.01)

(52) U.S. Cl.  
USPC .......................................................... 423/544

(58) Field of Classification Search  
None  
See application file for complete search history.

(56) References Cited

FOREIGN PATENT DOCUMENTS  
CA GB740837 A * 11/1955  
CN 101337692 * 1/2009

OTHER PUBLICATIONS

CN101337692 (Ma et al., Jan. 2009)—Translation.*  
Chinese priority application No. 201010135801.0 (in Chinese), with statement of relevance in English.

* cited by examiner

*Primary Examiner* — Emily Le  
*Assistant Examiner* — Anita Nassiri Motlagh  
(74) *Attorney, Agent, or Firm* — Nath, Goldberg & Meyer; Tanya E. Harkins

(57) ABSTRACT

Provided is a method for preparing manganese sulfate monohydrate, which comprises the following steps: (1) adding equimolar BaS or SrS solution into manganese sulfate solution to carry out reaction fully, and separating and washing the obtained solid; (2) mixing the solid with deionized water to prepare a slurry, dissolving the slurry with concentrated sulfuric acid, and separating solid from liquid to obtain $MnSO_4$ solution; (3) adding proper amount of hydrogen peroxide to the $MnSO_4$ solution, heating to boiling, adjusting the pH value of the solution within 5-6, evaporation the filtrate after a precise filtration, and crystallizing and drying to obtain $MnSO_4 \cdot H_2O$ product. Manganese sulfate monohydrate can be produced at high yield in a cost-efficient manner by this method.

9 Claims, 1 Drawing Sheet

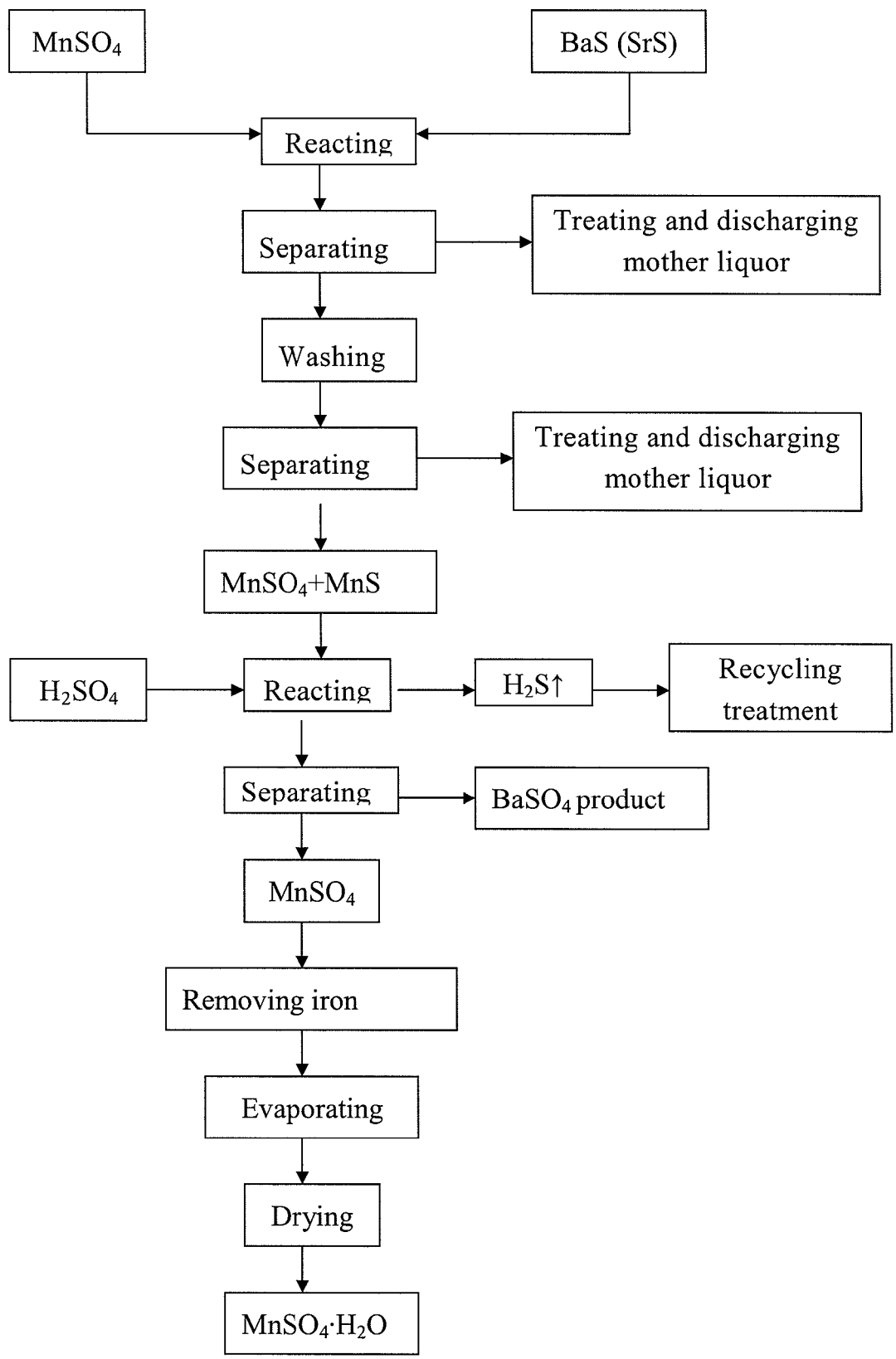

METHOD FOR PREPARING MANGANESE SULFATE MONOHYDRATE

This is a National Phase Application filed under 35 U.S.C. 371 as a national stage of PCT/CN2010/075309, filed Jul. 20, 2010, an application claiming the benefit under 35 USC 119 (e) Chinese Application No. 201010135801.0, filed Mar. 29, 2010, the content of each of which is hereby incorporated by reference in its entirety.

TECHNICAL FIELD

The present invention relates to a method for preparing manganese sulfate monohydrate.

BACKGROUND ART

The requirements for chemical standards of $MnSO_4 \cdot H_2O$ which is used as material of lithium ion auto power battery is relatively strict, hence refining treatment for the $MnSO_4 \cdot H_2O$ is needed. In prior art, carbonation refining process or ammonia refining process are mainly used. However, these methods have the following disadvantages: yield is low, separation efficiency is unobvious, and cost is relatively high.

SUMMARY OF THE INVENTION

The present invention provides a method for preparing manganese sulfate monohydrate ($MnSO_4 \cdot H_2O$). In the method, $MnSO_4$ reacts with BaS or SrS quantitatively to convert Mn into MnS, then concentrated sulfuric acid is added to dissolve MnS, and then $MnSO_4$ solution is formed. The $MnSO_4$ solution is evaporated and dried, thus Mn element in the $MnSO_4$ solution is recovered quantitatively.

The main contribution of the present invention is the thought of the reaction. The reagents and processing equipments used are commonly used in prior art, thus they are not key factors of the present invention, thereby they are briefly described as below.

The method mainly comprises the following steps:

1) Preparing manganese sulfate solution, adding equimolar BaS or SrS solution into the manganese sulfate solution to carry out reaction fully, and then carrying out solid-liquid separation for the obtained product, and washing the obtained solid phase;

Wherein, in step 1), any manganese sulfate can be chosen as raw material of manganese sulfate, such as the manganese sulfate which was prepared by flue gas desulfurization disclosed in the patent application No. 200910179944.9, manganese sulfate which was prepared by reacting strontium sulfide or barium sulfide and dioxide manganese ore, and then reacting with sulfuric acid, disclosed in the patent application No. 200910157921.8, and even commercial manganese sulfate may also be used. Manganese sulfate solution is prepared in a certain concentration, generally the range of 10-450 g/L is relatively suitable, the reason of which is that higher concentration will cause entrainment loss, and lower concentration will cause increase of energy consumption in following evaporation step. The purpose of the equimolar reaction of manganese sulfate with strontium sulfide or barium sulfide is mainly to carry out reaction fully and save the cost. If the sulfide is not sufficient, the recovery rate of the Mn element will be reduced, and excess sulfide will bring loss of sulfide. After the reaction is finished, the main components of the solid phase are barium sulfate and manganese sulfide, some impurity ions are also included. Main purpose of washing solid phase step is to remove soluble impurity ions from the solid phase, such as $K^+$, $Na^+$ and so on.

Preferably, during the step of washing solid phase in said step 1), hot water at temperature of 50-70□ are used, washing time is 1-2 hours, and the solid may be washed several times.

2) Adding deionized water into the solid phase obtained from solid-liquid separation in step 1) so as to prepare a slurry, and then dissolving the slurry with concentrated sulfuric acid, carrying out solid-liquid separation;

Wherein, $MnSO_4$ in the filtrate is to be carried out purification treatment procedure, and then the solid phase whose main component is $BaSO_4$ is washed and dried, so as to obtain $BaSO_4$ product.

Preferably, in said step 2), after adding concentrated sulfuric acid, produced $H_2S$ gas may be absorbed by BaS or SrS solution. The obtained $Sr(HS)_2$ or $Ba(HS)_2$ may function as reductive sulfide to react with $MnO_2$.

3) adding proper amount of hydrogen peroxide to the $MnSO_4$ solution obtained from the step of solid-liquid separation in step 2), heating until boiling, adjusting the pH value of the solution within 5-6, then carrying out precise filtration for the obtained product, evaporating and crystallizing the filtrate and drying the obtained crystalline so as to obtain $MnSO_4 \cdot H_2O$ product.

Wherein, in step 3), hydrogen peroxide is added in order to remove impurities such as Fe, on the other hand, a small amount of sulfide may be oxidized by the hydrogen peroxide, and in the same time there is no other impurities introduced.

Preferably, compounds which will not introduce new impurities could be chosen in the step of adjusting pH value during step 3), for example basic compounds of manganese, such as $Mn(OH)_2$ or $MnCO_3$.

Preferably, in said step 3), before adding hydrogen peroxide, pH value of the obtained solution may be adjusted within 1-2, which is also preferably carried out by using $Mn(OH)_2$ or $MnCO_3$. The aim of adjusting pH value is that if the acidity of the solution is too strong, after adding hydrogen peroxide, more $Mn(OH)_2$ or $MnCO_3$ will be used during the step of neutralizing the solution, which causes that the introduced amount of impurities such as Fe increase, thus the quality of the product is affected.

Preferably, the precise filtration in step 3) could be carried out by using filter membrane with a diameter of 0.24-0.45 μm, and could be realized through filter press.

Chemical reactions involved in the present invention mainly comprise:

$$MnSO_4 + BaS \rightarrow BaSO_4 + MnS$$

$$MnSO_4 + SrS \rightarrow SrSO_4 + MnS$$

$$MnS + H_2SO_4 \rightarrow MnSO_4 + H_2S\uparrow$$

The main process flow diagram of the method of the present invention is shown as FIG. 1.

In the present invention, Mn element of $MnSO_4$ solution is recovered quantitatively by reacting $MnSO_4$ with BaS or SrS, through which the recovery efficiency of Mn element during refining process for $MnSO_4$ is increased. The preparing method in the present invention has high yield, obvious separation efficiency and low cost.

BRIEF DESCRIPTION OF THE DRAWINGS

FIG. 1 shows the main process flow diagram of the method in the present invention.

EMBODIMENT

Example 1

2000 mL of $MnSO_4$ solution (the $MnSO_4$ solution was obtained by the following steps: Barium sulfide was reacted with $MnO_2$ ore which was produced by Guizhou Redstar Developing Co., Ltd to form a mixture, and then sulfuric acid was added to the mixture to carry out reaction so as to form $MnSO_4$ solution) was put in a 5000 mL beaker, the concentration of $MnSO_4$ solution is determined as 108.5 g/L, and 1868 mL of BaS solution with a concentration of 130 g/L was added into the beaker. Reaction was carried out under agitation, and then the mixture was separated by suction filtration. The obtained filtrate was discarded, and the obtained filter cake was mixed with water to prepare a slurry. The slurry was washed for 1 hour at 70□ to form a mixture, and then the mixture was separated by suction filtration. The obtained filtrate was discarded, the obtained filter cake was mixed with water to obtain a slurry, and 80 ml of concentrated sulfuric acid was added to dissolve the slurry, and then the above solution was separated by suction filtration. The pH value of the obtained filtrate is adjusted to 1 with $MnCO_3$ firstly. 10 ml of industrial-grade hydrogen peroxide with a concentration of 27.5 wt % was added in the filtrate, and the mixture was heated to boiling. Then the pH value of the obtained solution was neutralized to 5 with $MnCO_3$. And then the mixture was precise filtered with filter press whose diameter of the filter membrane is 0.24 μm. The obtained clear filtrate was evaporated and the obtained crystalline was dried at 85° C. for 16 hours to obtain sample 1# of $MnSO_4.H_2O$.

Example 2

8000 mL of $MnSO_4$ solution which was prepared by flue gas desulfurization was taken out, the concentration of $MnSO_4$ solution is determined as 12.4 g/L, and 854 mL of BaS solution with a concentration of 130 g/L was added into the beaker. Reaction was carried out under agitation, and then the mixture was separated by suction filtration. The obtained filtrate was discarded, and the obtained filter cake was mixed with water to prepare a slurry. The slurry was washed for 1 hour at 80□ to form a mixture, and then the mixture was separated by suction filtration. The obtained filtrate was discarded, the obtained filter cake was mixed with water to obtain a slurry, and 36.5 ml of concentrated sulfuric acid was added to dissolve the slurry, and then the above solution was separated by suction filtration. 10 ml of industrial-grade hydrogen peroxide with a concentration of 27.5 wt % was added in the obtained filtrate, and the mixture was heated to boiling. The pH value of the obtained solution was neutralized to 5 with $Mn(OH)_2$, and then the mixture was precise filtered with filter press whose diameter of the filter membrane is 0.30 μm. The obtained clear filtrate was evaporated and the obtained crystalline was dried at 85° C. for 16 hours to obtain sample 2# of $MnSO_4.H_2O$.

Example 3

1000 ml of the $MnSO_4$ solution which was prepared with commercial manganese sulfate with a concentration of 450 g/L was taken out, and 3874 mL of BaS solution with a concentration of 130 g/L was added into the beaker. Reaction was carried out under agitation, and then the mixture was separated by suction filtration. The obtained filtrate was discarded, and the obtained filter cake was mixed with water to prepare a slurry. The slurry was washed for 2 hours at 50□ to form a mixture, and then the mixture was separated by suction filtration. The obtained filtrate was discarded, the obtained filter cake was mixed with water to prepare a slurry, and 148 ml of concentrated sulfuric acid was added to dissolve the slurry, and then the above solution was separated by suction filtration. The pH value of the obtained filtrate is adjusted to 2 with $Mn(OH)_2$ firstly. 10 ml of industrial-grade hydrogen peroxide with a concentration of 27.5 wt % was added in the obtained filtrate, and the mixture was heated to boiling. Then the pH value of the obtained solution was neutralized to 6 with $Mn(OH)_2$, and then the mixture was precise filtered with filter press whose diameter of the filter membrane is 0.45 μm. The obtained clear filtrate was evaporated and the obtained crystalline was dried at 85° C. for 16 hours to obtain sample 3# of $MnSO_4.H_2O$.

Example 4

1000 mL of $MnSO_4$ solution (the $MnSO_4$ solution was prepared by the following steps: strontium sulfide was reacted with $MnO_2$ ore which were produced by Guizhou Redstar Developing Co., Ltd to form a mixture, and then sulfuric acid was added to the mixture to carry out reaction so as to obtain $MnSO_4$ solution) was put in a 5000 mL beaker, the concentration of $MnSO_4$ solution is determined as 256 g/L, and 4034 mL of SrS solution with a concentration of 50 g/L was added into the beaker. Reaction was carried out under agitation, and then the mixture was separated by suction filtration. The obtained filtrate was discarded, and the obtained filter cake was mixed with water to prepare a slurry. The slurry was washed for 1.5 hours at 70□ to form a mixture, and then the mixture was separated by suction filtration. The obtained filtrate was discarded, the obtained filter cake was mixed with water to obtain a slurry, and 94.2 ml of concentrated sulfuric acid was added to dissolve the slurry, and then the above solution was separated by suction filtration. 10 ml of industrial-grade hydrogen peroxide with a concentration of 27.5 wt % was added in the filtrate, and the mixture was heated to boiling. The pH value of the obtained solution was neutralized to 6 with $MnCO_3$, and then the mixture was precise filtered with filter press whose diameter of the filter membrane is 0.45 μm. The obtained clear filtrate was evaporated and dried at 85° C. for 16 hours to obtain sample 4# of $MnSO_4.H_2O$.

Weight contents of some components of each sample obtained in foregoing examples are shown in the following table:

|  | 1# | 2# | 3# | 4# |
|---|---|---|---|---|
| $MnSO_4 \cdot H_2O$ content % | 99.57 | 99.34 | 99.60 | 99.41 |
| K PPm | <10 | <10 | <10 | <10 |
| Na PPm | <10 | <10 | <10 | <10 |
| Ca PPm | <50 | <50 | <50 | <50 |
| Mg PPm | <50 | <50 | <50 | <50 |
| Fe | <1.0 | <1.0 | <1.0 | <1.0 |
| Heavy metals (Counted as Pb) | Undetected | Undetected | Undetected | Undetected |

It can be concluded from above table, manganese sulfate monohydrate with higher purity could be produced through the method in the present invention, and the content of various metal impurities were reduced remarkably.

The invention claimed is:
1. A method for preparing manganese sulfate monohydrate, comprising the following steps:
1) preparing manganese sulfate solution;
2) adding equimolar BaS or SrS solution into the prepared manganese sulfate solution to carry out reaction fully, and then carrying out solid-liquid separation for obtained product, and washing obtained solid phase;

3) adding deionized water into the solid phase obtained from the step of solid-liquid separation in step 2) to prepare a slurry, dissolving the slurry with concentrated sulfuric acid, and carrying out solid-liquid separation for the obtained product of $MnSO_4$ solution; and 4) adding proper amount of hydrogen peroxide to the $MnSO_4$ solution obtained from the step of solid-liquid separation in step 3), heating the mixture until boiling, adjusting the pH value of the mixture within 5-6, and carrying out precise filtration for the obtained product, evaporating and crystallizing the filtrate and drying obtained crystalline to obtain manganese sulfate monohydrate product.

2. The method according to claim 1, characterized in that, concentration of manganese sulfate solution in said step 2) is 10-450 g/L.

3. The method according to claim 1, characterized in that, in the step of washing solid phase in said step 2), hot water at temperature of 50-70° C. is used to wash.

4. The method according to claim 3, characterized in that, in the step of washing solid phase in said step 2), washing time is 1-2 hours.

5. The method according to claim 1, characterized in that, in said step 3), after adding concentrated sulfuric acid, produced $H_2S$ gas is absorbed and recycled by BaS or SrS.

6. The method according to claim 1, characterized in that, in said step 4), before adding hydrogen peroxide, pH value of the obtained solution is adjusted within 1-2 firstly.

7. The method according to claim 1, characterized in that, in said step 4), $Mn(OH)_2$ or $MnCO_3$ is used to adjust the pH value.

8. The method according to claim 1, characterized in that, in said step 4), precise filtration is carried out by using filter membrane with a diameter of 0.24-0.45 pm.

9. The method according to claim 6, characterized in that, in said step 4), $Mn(OH)_2$ or $MnCO_3$ is used to adjust the pH value.

* * * * *

UNITED STATES PATENT AND TRADEMARK OFFICE
CERTIFICATE OF CORRECTION

PATENT NO. : 8,480,997 B2
APPLICATION NO. : 13/581511
DATED : July 9, 2013
INVENTOR(S) : Zhiguang Jiang and Dong Hua It is certified that error appears in the above-identified patent and that said Letters Patent is hereby corrected as shown below:

In the Claims

Claim 8, column 6, Line 15, after "0.24-0.45"

Please delete "pm" and replace with "μm".

Signed and Sealed this
Twenty-ninth Day of October, 2013

Teresa Stanek Rea
*Deputy Director of the United States Patent and Trademark Office*